DeW. C. SMILEY.
REFRIGERATOR.
No. 173,243.
Patented Feb. 8, 1876.
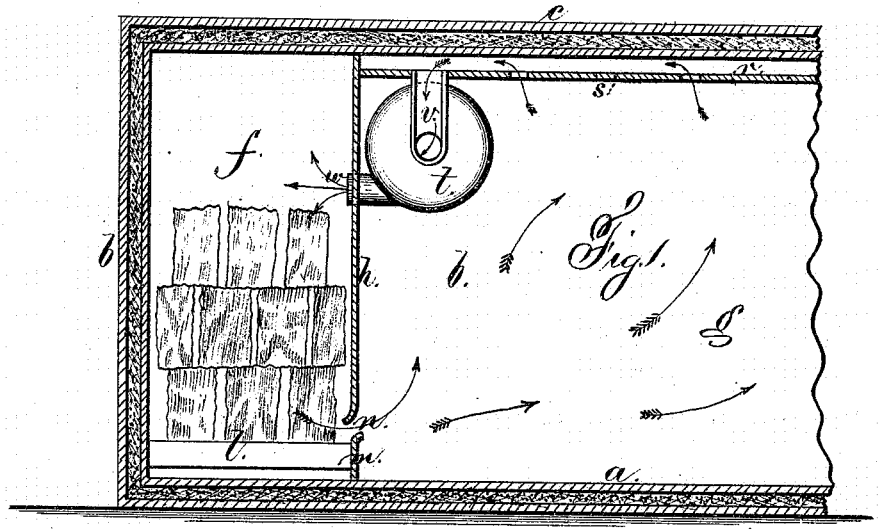
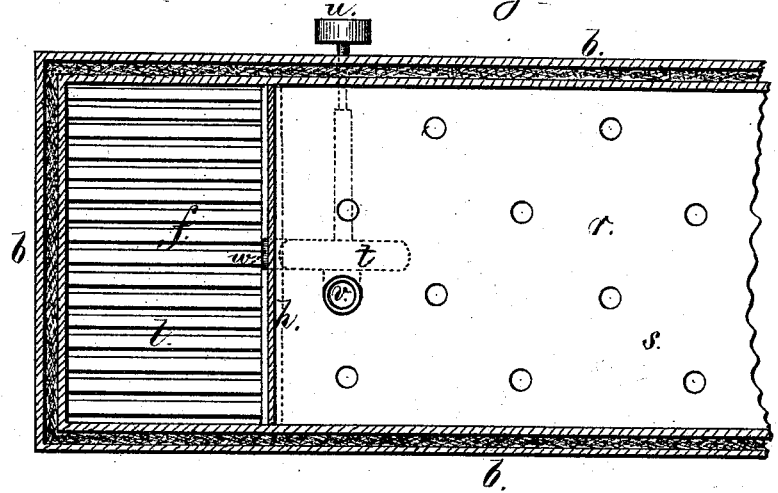

UNITED STATES PATENT OFFICE.

DE WITT C. SMILEY, OF BROOKLYN, NEW YORK.

IMPROVEMENT IN REFRIGERATORS.

Specification forming part of Letters Patent No. 173,243, dated February 8, 1876; application filed September 30, 1875.

*To all whom it may concern:*

Be it known that I, DE WITT C. SMILEY, of Brooklyn, in the county of Kings and State of New York, have invented an Improvement in Refrigerators, of which the following is a specification:

Refrigerators have been made in which the circulation of air is maintained by a blower, but the arrangement of parts has been such that the circulation has not been uniform.

My invention relates to a refrigerator divided, by a perforated horizontal partition, into a lower cooling-chamber and an upper air distributing and circulating chamber, combined with an ice-chamber, having an upper air-inlet and a lower air-outlet extending the width, or nearly so, of the ice-chamber, and an air exhausting and forcing device, that draws the warmer atmosphere uniformly into the upper chamber, and forces it into the ice-chamber, so as to produce a gradual downward circulation in said ice-chamber.

By this construction of refrigerator the chamber is kept of nearly uniform temperature, and the ice is not consumed disadvantageously.

In the drawing, Figure 1 is a vertical section of the ice-chamber and a portion of the cooling-chamber, and Fig. 2 is a sectional plan of the same.

The bottom $a$, sides $b$, and top $c$ of the refrigerator are, by preference, made double and lined with non-conducting material of any usual character, and the refrigerator or refrigerating apparatus is to be of dimensions suitable to the material to be received or transported, and to the quantity of ice employed. The ice-chamber $f$ is separated from the cooling-chamber $g$ by a partition, $h$, preferably of galvanized iron. This does not extend to the grating $l$ at the bottom of the ice-chamber, but stops sufficiently above it to leave an opening or horizontal mouth, $n$, and there is a deflector-plate, $m$, that prevents water or particles of ice passing into the chamber $g$. Above the cooling-chamber $g$ there is a circulating-chamber, $r$, that is separated from $g$ by a perforated plate, $s$, and the blower $t$, that is driven by the shaft and pulley $u$, or otherwise, is provided with a suction-pipe, $v$, from the air-space $r$, and a pipe, $w$, from the blower to the ice-chamber $f$, so that the air is caused to circulate around through the respective chambers, and in the ice-chamber a uniform downward current is produced by the pressure resulting from the supply of air being forced into the upper part.

I do not claim drawing air through a conduit in the upper part of the closed chamber and forcing it into the ice-chamber and back into the cooling-chamber through an opening extending substantially across the chamber.

I claim as my invention—

1. The combination of a cooling-chamber, $g$, and an air distributing and circulating chamber, $r$, above it, and of nearly equal horizontal dimensions, and separated by a perforated partition, $s$, an air exhausting and forcing device, an ice-chamber, an upper air-inlet, and a lower air-outlet extending the width, or nearly so, of the ice-chamber, substantially as and for the purposes set forth.

2. The cooling-chamber $g$ and the circulating-chamber $r$ in the upper part thereof, separated by the partition $s$, that is perforated throughout, in combination with an ice-chamber and a blower to exhaust the atmosphere from the chamber $r$, and force the same into the ice-chamber, substantially as set forth.

Signed by me this 27th day of September, A. D. 1875.

DE WITT C. SMILEY.

Witnesses:
GEO. T. PINCKNEY,
GEO. D. WALKER.